United States Patent
Li (10) Patent No.: US 8,195,193 B2
(45) Date of Patent: Jun. 5, 2012

(54) GROUPING MOBILE INSTANT MESSAGING CONTACTS BASED ON POSITION

(75) Inventor: Linfei Li, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 139 days.

(21) Appl. No.: 12/727,828

(22) Filed: Mar. 19, 2010

(65) Prior Publication Data

US 2010/0178937 A1      Jul. 15, 2010

Related U.S. Application Data

(63) Continuation of application No. PCT/CN2008/072361, filed on Sep. 12, 2008.

(30) Foreign Application Priority Data

Sep. 24, 2007 (CN) .......................... 2007 1 0077259

(51) Int. Cl.
*H04W 4/02* (2009.01)
*H04W 64/00* (2009.01)
(52) U.S. Cl. .................................. 455/456.1; 455/414.1
(58) Field of Classification Search .......................... None
See application file for complete search history.

(56) References Cited

U.S. PATENT DOCUMENTS

| 2002/0007396 A1* | 1/2002 | Takakura et al. ............. 709/205 |
| 2006/0160548 A1 | 7/2006 | Chen et al. |

FOREIGN PATENT DOCUMENTS

| CN | 1324054 A | 11/2001 |
| CN | 1523903 A | 8/2004 |
| CN | 1630277 A | 6/2005 |
| CN | 101127735 A | 2/2008 |
| CN | 101127947 A | 2/2008 |
| EP | 1154666 A2 | 11/2001 |

OTHER PUBLICATIONS

Chinese Refusal Decision for Chinese Patent Application No. 200710077259.6, dated Oct. 29, 2010, and English summary thereof.
Chinese Office Action for Chinese Patent Application No. 200710077259.6, dated Feb. 5, 2010, and English summary thereof.
Chinese Office Action for Chinese Patent Application No. 200710077259.6, dated May 20, 2010, and English summary thereof.
International Search Report for International Application No. PCT/CN2008/072361, dated Dec. 25, 2008, and English translation thereof.

* cited by examiner

*Primary Examiner* — Philip Sobutka (57) ABSTRACT

The present invention relates to communication technologies, and provides a method, system and device for grouping a mobile Instant Messaging (IM) contact. The system includes a positioning module, configured to query information of a region at which a mobile terminal of a mobile IM contact locates; and an automatic grouping module, configured to obtain the information of the region at which the mobile terminal of the mobile IM contact locates from the positioning module, and group the mobile IM contact according to the information of the region. Embodiments of the present invention may improve the accuracy of the grouping result, and may greatly improve the efficiency of the grouping.

11 Claims, 5 Drawing Sheets

GROUPING MOBILE INSTANT MESSAGING CONTACTS BASED ON POSITION

CROSS-REFERENCE TO RELATED APPLICATIONS

This application is a continuation of International Application No. United States Patent Application No. PCT/CN2008/072361, filed on Sep. 12, 2008. This application claims the benefit and priority of Chinese Patent Application No. 200110077259.6, filed Sep. 24, 2007. The entire disclosures of each of the above applications are incorporated herein by reference.

FIELD

The present disclosure relates to communication technologies, and more particularly, to a method, system and device for grouping a mobile Instant Messaging (IM) contact.

BACKGROUND

This section provides background information related to the present disclosure which is not necessarily prior art.

The Instant Messaging (IM) is an Internet-based and widely used service. IM users may quickly and conveniently communicate with the IM contact through an IM system, and may also manage information of the IM contact through the IM system. Thus, the communication mode has won numerous user groups.

As for the management of the information of the IM contacts, the IM users may group the IM contacts according to attributes of the IM contacts, e.g., the IM contacts may be divided into groups, such as grade school classmates, middle school classmates, university classmates, colleagues, and family members, etc. according to a relation attribute of the IM contacts, the IM contacts may also be grouped according to locations of the IM contacts. Embodiments of the present invention mainly relate to group the mobile IM contacts. The mobile IM contacts refer to IM contacts who log on mobile terminals. A mobile IM contact may log on the mobile terminal at different locations every time.

In the conventional method, the mobile IM contacts are grouped into a certain user group manually with a manual setting mode. When the grouping is performed according to region attributes, the mobile IM contacts are generally grouped according to location information in register data of the mobile IM contacts. If a region attribute of a mobile IM contact changes, it is necessary to adjust the group to which the mobile IM contact belongs manually. However, because the region attribute of a mobile IM contact is uncertain, the manual grouping mode cannot guarantee the accuracy of the grouping result. Besides, the efficiency of the manual grouping is relatively low.

Therefore, a new method for grouping the mobile IM contact is needed, to improve the accuracy of the grouping result and improve the efficiency of the grouping.

SUMMARY

This section provides a general summary of the disclosure, and is not a comprehensive disclosure of its full scope or all of its features.

Embodiments of the present invention provide a system for grouping the mobile IM contact, to solve the problem of low accuracy in the grouping result and low efficiency in the grouping in the conventional grouping technologies.

Embodiments of the present invention provide an automatic grouping module for grouping the mobile IM contact, to better solve the above problem in the conventional method.

Embodiments of the present invention provide a method for grouping the mobile IM contact utilizing the automatic grouping module, to better solve the above problem in the conventional method.

Embodiments of the present invention provide a system for grouping a mobile IM contact, which includes:
 a positioning module, configured to query information of a region at which a mobile terminal of a mobile IM contact locates; and
 an automatic grouping module, configured to obtain the information of the region at which the mobile terminal of the mobile IM contact locates from the positioning module, and group the mobile IM contact according to the information of the region.

Embodiments of the present invention also provide an automatic grouping module for grouping a mobile IM contact, in which
 the automatic grouping module is configured to obtain information of a region at which a mobile terminal of a mobile IM contact locates, and group the mobile IM contact according to the information of the region.

Embodiments of the present invention also provide a method for grouping a mobile IM contact, which includes:
 obtaining information of a region at which a mobile terminal of a mobile IM contact locates; and
 grouping the mobile IM contact according to the information of the region.

In the embodiments of the present invention, the automatic grouping module obtains current and accurate information of the region at which the mobile terminal locates through a terminal positioning system and geographic information system, and groups the mobile IM contacts according to the information of the region. By grouping the mobile IM contacts using the technologies provided by embodiments of the present invention, the accuracy of grouping result may be improved. Besides, because the grouping mode does not need manual operations, the efficiency of the grouping is enhanced.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Reference throughout this specification to "one embodiment," "an embodiment," "specific embodiment," or the like in the singular or plural means that one or more particular features, structures, or characteristics described in connection with an embodiment is included in at least one embodiment of the present disclosure. Thus, the appearances of the phrases "in one embodiment" or "in an embodiment," "in a specific embodiment," or the like in the singular or plural in various places throughout this specification are not necessarily all referring to the same embodiment. Furthermore, the particular features, structures, or characteristics may be combined in any suitable manner in one or more embodiments.

To make objectives, technical solutions and advantages of the present invention more apparent, further detailed descriptions for the invention are provided in the following accompanying with drawings and embodiments. It should be understood that, the specific embodiments described herein are only used for describing the invention, but are not intended to limit the invention.

Figure 1:
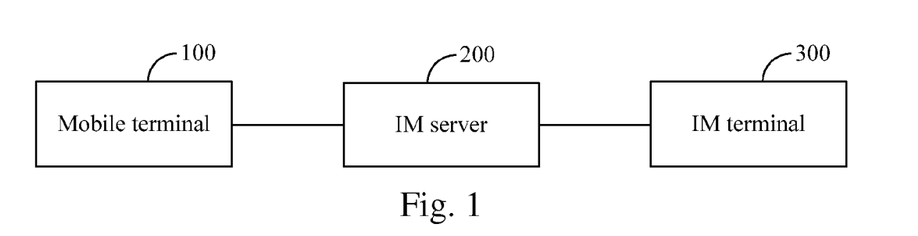
FIG. 1 is a schematic diagram illustrating structure of a system for grouping the mobile IM contact.

As shown in FIG. 1, FIG. 1 is an application scene of an embodiment of the present invention, that is, a system for grouping the mobile IM contact. The system includes a mobile terminal 100, an IM server 200 and an IM terminal 300. In this embodiment of the present invention, the IM server 200 is not limited to a server, and may be an IM module capable of implementing functions possessed by the IM server 200.

In this embodiment of the present invention, the system for grouping the mobile IM contact includes a mobile terminal on which a mobile IM contact logs, an IM terminal on which a user logs and an IM module which provides communication services for the user and the mobile IM contact, and shows the user the grouping result of the mobile IM contact. The system further includes an automatic grouping server and a positioning server. In this embodiment of the present invention, the automatic grouping server is not limited to a given server, and may be an automatic grouping module capable of implementing the same functions as the automatic grouping server. The automatic grouping module may be an independent entity, or may be integrated into a server or a terminal device. Correspondingly, the positioning server is not limited to a given server, and may be a positioning module capable of implementing the same functions as the positioning server. When a mobile IM contact logs on the IM module with a mobile terminal, the IM module records an online state of the mobile IM contact, meanwhile notifies the IM terminal and the automatic grouping module of the online state. The automatic grouping module obtains information of the region at which the mobile terminal currently locates through the positioning module and utilizing Location Based Service (LBS) and Geographic Information System (GIS) technologies, groups the mobile IM contact according to the information of the region thereof, and sends the grouping result to the IM module for saving. It can be seen from the above descriptions that the accuracy of the grouping result may be enhanced by utilizing the grouping method provided by this embodiment of the present invention.

Figure 2:
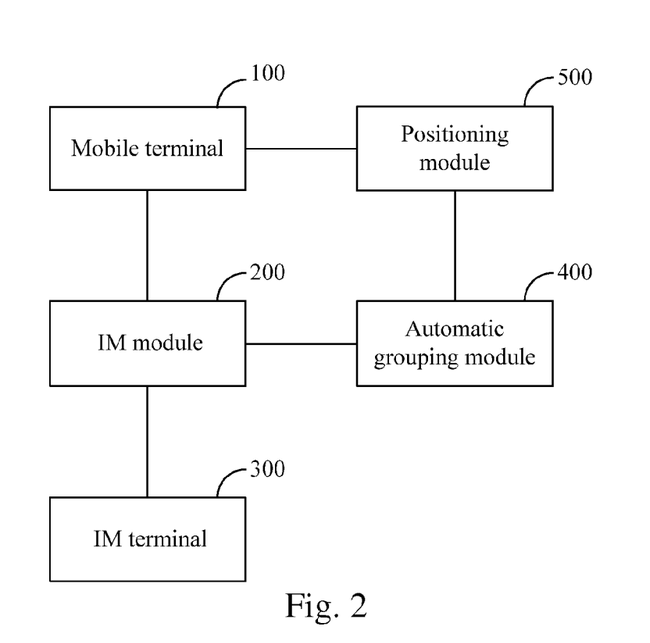
FIG. 2 is a schematic diagram illustrating structure of a system for grouping the mobile IM contact in accordance with an embodiment of the present invention.

FIG. 2 illustrates structure of a system for grouping the mobile IM contact in accordance with an embodiment of the present invention. The system includes a mobile terminal 100, an IM module 200, an IM terminal 300, an automatic grouping module 400 and a positioning module 500. It should be explained that the connection relationships among the devices in all the drawings depicting embodiments of the present invention are merely used for describing the information exchange and control process. Thus, they should be regarded as logical connection relationships, and should not be limited to physical connections.

(1) The mobile terminal 100, with the mobile IM contact logged on, may be a mobile terminal, typically for example, a Personal Computer (PC), Person Digital Assistant (PDA), Mobile Phone (MP), etc. with various LBS functions. In the embodiments of the present invention, the mobile terminal should not be limited to a mobile terminal of a certain type.

(2) The IM terminal 300, with a user logged on, may be every kind of terminal device capable of performing the IM, includes but is not limited to the mobile terminal.

(3) The IM module 200 respectively communicating with the mobile terminal 100 and the IM terminal 300, is configured to provide the communication services for the user and the mobile IM contact, and send the grouping result of the mobile IM contact to the IM terminal 300 on which the user logs for displaying in accordance with the embodiment of the present invention. The number of the mobile terminal 100 and the IM terminal 300 connected with the IM module 200 is not limited. Thus, the system illustrated by FIG. 2 is only a simplest example, which is not used for limiting the protection scope.

(4) The automatic grouping module 400, communicating with the IM module 200, is configured to obtain information of the region at which the mobile terminal 100 locates from the positioning module 500, after receiving the online state of the mobile IM contact reported by the IM module 200, and group the mobile IM contact according to the information of the region at which the mobile terminal 100 locates, and send the grouping result to the IM module 200 for saving and the query of the user.

Figure 4:
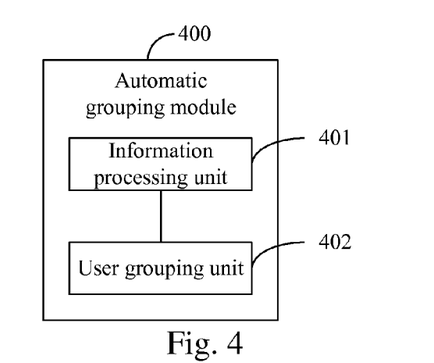
FIG. 4 is a diagram illustrating inner structure of an automatic grouping module in accordance with an embodiment of the present invention.

In an embodiment, the specific inner structure of the automatic grouping module 400 is shown in FIG. 4. The automatic grouping module 400 includes an information processing unit 401 and a user grouping unit 402. The information processing unit 401 is configured to obtain the information of the region at which the mobile terminal 100 locates from the positioning module 500, and send the grouping result of the mobile IM contact to the IM module 200 for saving. The user grouping module 402, communicating with the information processing unit 401, is configured to group the mobile IM contact according to the information of the region at which the mobile terminal 100 locates obtained by the information processing unit 401, and send the grouping result to the information processing unit 401. And then, the information processing unit 401 sends the grouping result to the IM module 200.

(5) The positioning module 500, communicating with the automatic grouping module 400, is configured to query the information of the region at which the mobile terminal 100 locates according to a query request initiated by the automatic grouping module 400, and return a query result to the automatic grouping module 400. In the system structure illustrated by FIG. 2, the positioning module 500 is a device integrating with the functions of both the LBS and GIS technologies. And the positioning module 500 may independently obtain the information of the region at which the mobile terminal 100 locates. The specific process includes the following. The automatic grouping module 400 sends a terminal location query request to the positioning module 500. The positioning module 500 determines the location information of the mobile terminal 100 utilizing the LBS technology, and returns the location information to the automatic grouping module 400. The automatic grouping module 400 further sends a terminal region query request to the positioning module 500 according to the location information of the mobile terminal 100. The positioning module 500 determines the information of the region at which the mobile terminal 100 locates utilizing the GIS technology, and returns the information of the region to the automatic grouping module 400.

Figure 3:
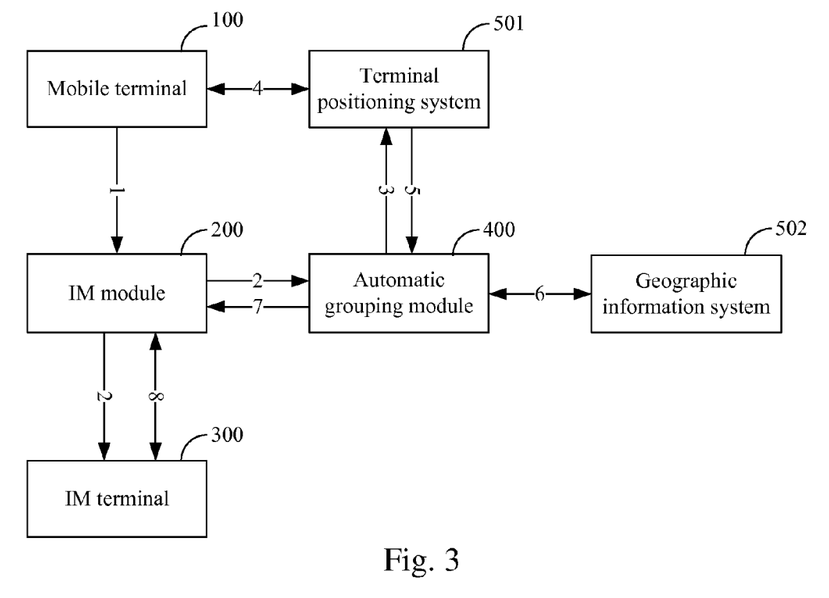
FIG. 3 is a schematic diagram illustrating structure of a system for grouping the mobile IM contact in accordance with an embodiment of the present invention.

In an embodiment, the system as shown in FIG. 3 includes a terminal positioning system 501 and a geographic information system 502. It should be noted that, seen from the current network architecture and implementing modes of embodiments in the present invention, the system structure is the most typical example. In the system, the terminal positioning system 501 is configured to determine the location information of the mobile terminal 100 utilizing the LBS technology and according to the terminal location query request initiated by the automatic grouping module 400, and return the determined location information to the automatic grouping module 400. The geographic information system 502 is configured to determine information of the region at which the mobile terminal 100 locates utilizing the GIS technology, according to the location information of the mobile terminal 100 sent from the automatic grouping module 400 and the terminal region query request initiated by the automatic grouping module 400, and return the information of the region at which the mobile terminal 100 locates to the automatic grouping module 400. In the diagram depicting the embodiment of the present invention, the arrows and numbers (1, 2, . . . , 8) indicate flow directions of signals generated in the process of grouping the mobile IM contact in accordance with the embodiment of the present invention. It should be noted that, the protection scope of the present invention is not limited to the system illustrated in FIG. 3.

Figure 5:
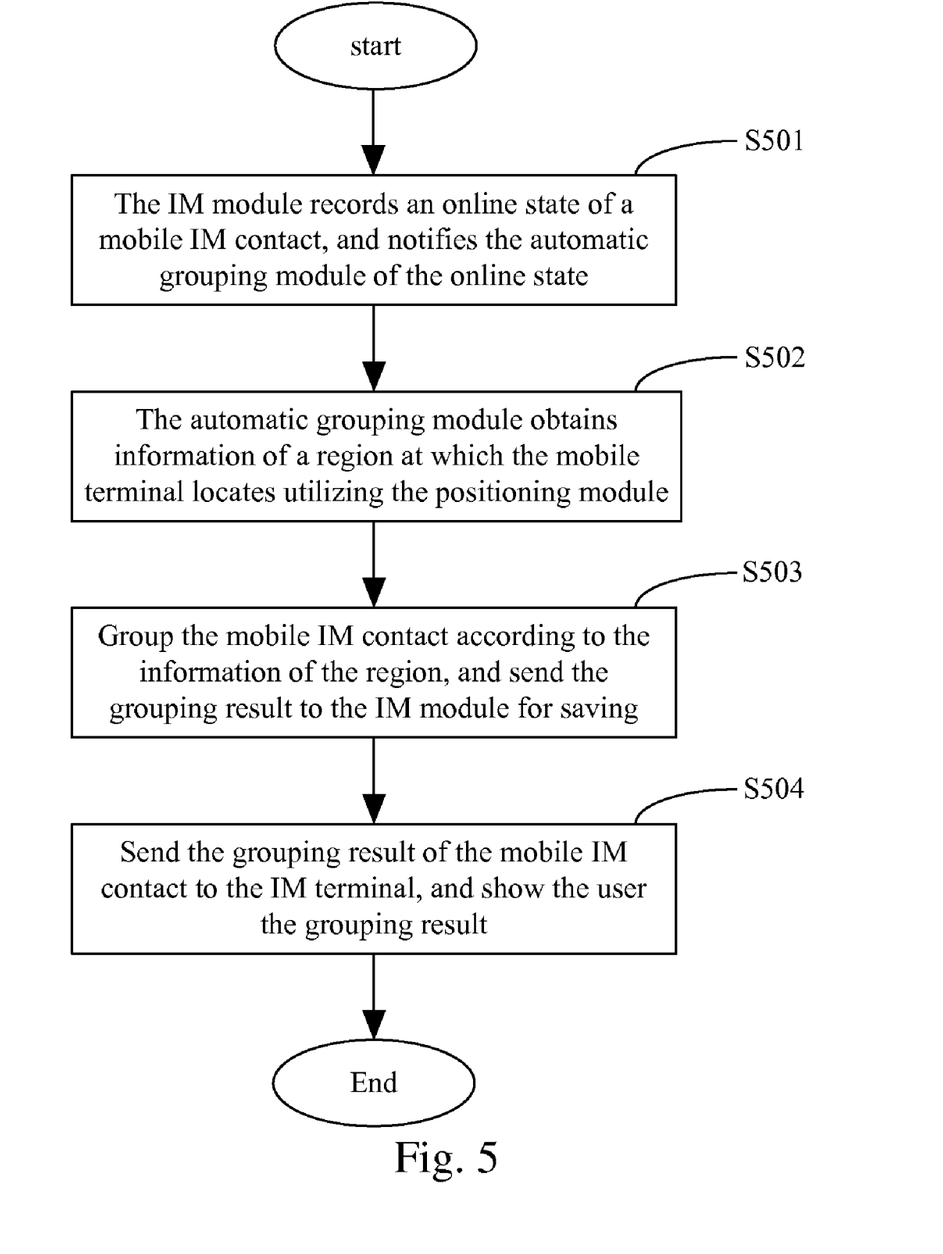
FIG. 5 is a flow chart illustrating a method for grouping the mobile IM contact in accordance with an embodiment of the present invention.

FIG. 5 is a flow illustrating a method for grouping a mobile IM contact in accordance with an embodiment of the present invention. The method flow is based on the system structure as shown in FIG. 2. The specific process is as follows.

Before all the processes of the embodiment of the present invention are executed, the user logs on the IM module 200 with the IM terminal 300. After logging on, the user sets grouping his/her contact (including the mobile IM contact) based on the region attribute.

Block S501: A mobile IM contact logs on the IM module 200 with the mobile terminal 100. The IM module 200 records the online state of the user, and sends the recorded online state to the IM terminal 300 and the automatic grouping module 400.

Block S502: The automatic grouping module 400 obtains the information of the region at which the mobile terminal 100 currently locates through the positioning module 500 communicating with the automatic grouping module 400.

Block S503: The automatic grouping module 400 groups the mobile IM contact according to the information of the region at which the mobile terminal 100 locates, and sends the grouping result to the IM module for saving. Till then, the automatic grouping module 400 completes the grouping for the mobile IM contact.

Block S504: The IM module 200 sends the grouping result of the mobile IM contact to the IM terminal 300, so that the IM terminal 300 displays the group result on the user interface. In the embodiment of the present invention, the IM module 200 may execute block S504 according to various initiating conditions, for example, on the basis of a query request initiated by a user, or the IM module 200 may automatically send the grouping result to the IM terminal 300.

Figure 6:
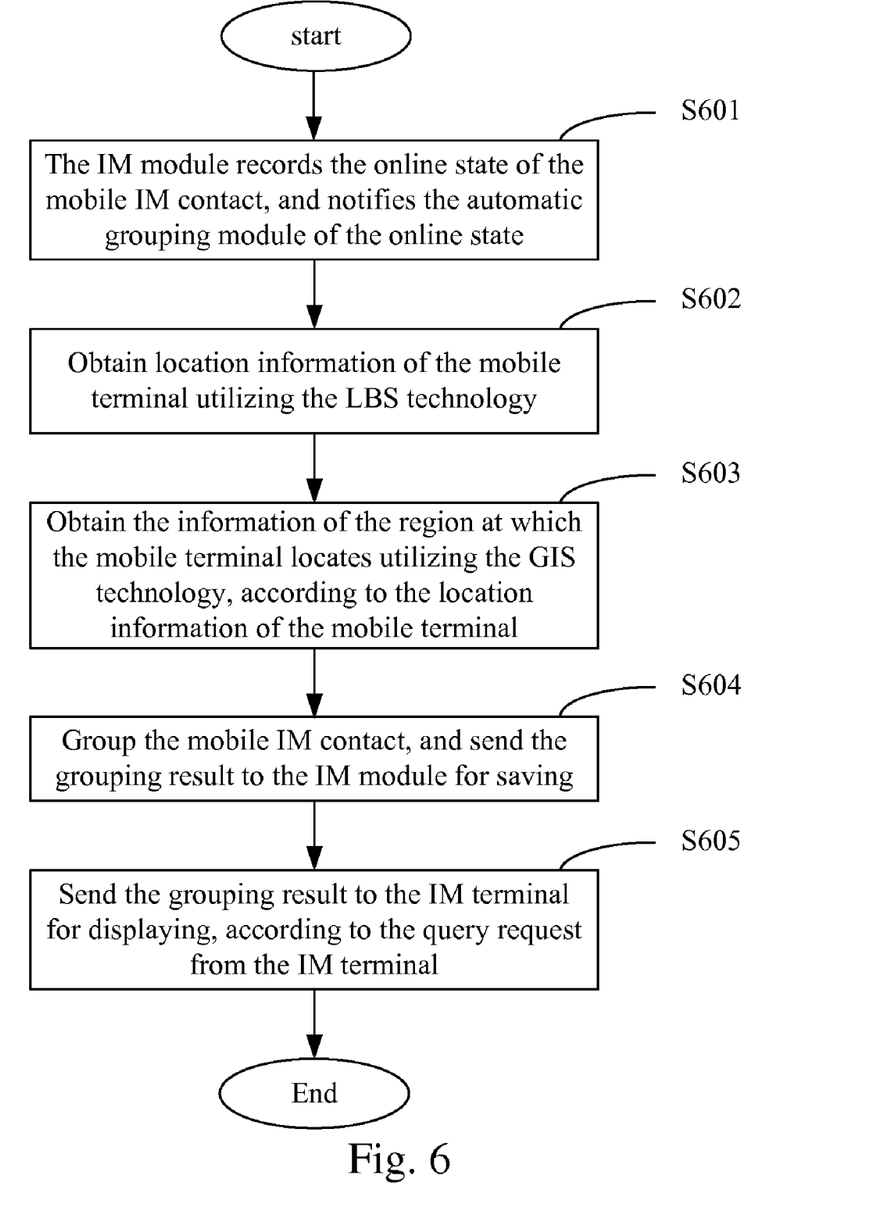
FIG. 6 is a flow chart illustrating a method for grouping the mobile IM contact in accordance with an embodiment of the present invention.

FIG. 6 is a flow illustrating a method for grouping the mobile IM contact in accordance with an embodiment of the present invention. The method flow is on the basis of the system structure as shown in FIGS. 2 and 3. The specific process is as follows.

Before all the blocks in the embodiment of the present invention are executed, a user logs on the IM module 200 with the IM terminal 300. After logging on the IM module 200, the user sets grouping his/her contact (including the mobile IM contact) according to the region attribute.

Block S601: A mobile IM contact logs on the IM module 200 with the mobile terminal 100. The IM module 200 records the online state of the user, and sends the recorded online state to the IM terminal 300 and the automatic grouping module 400.

Block S602: The automatic grouping module 400 sends a terminal location query request to the terminal positioning system 501. The terminal positioning system 501 interacts with the mobile terminal 100 utilizing the LBS technology, to obtain the location information of the mobile terminal 100, and returns the obtained location information to the automatic grouping module 400.

Block S603: After receiving the location information of the mobile terminal 100, the automatic grouping module 400 further sends a terminal region query request to the geographic information system 502 according to the location information of the mobile terminal 100. The geographic information system 502 performs the query utilizing the GIS technology, to obtain the information of the region at which the mobile terminal 100 locates, and returns the obtained information of the region to the automatic grouping module 400.

Block S604: The automatic grouping module 400 groups the mobile IM contact according to the information of the region at which the mobile terminal 100 locates, and sends the grouping result to the IM module 200 for saving.

Block S605: The grouping result of the mobile IM contact is sent to the IM terminal 300, so that the IM terminal 300 displays the grouping result on the user interface according to the query request sent by the user who logs on the IM terminal 300.

Figure 7:
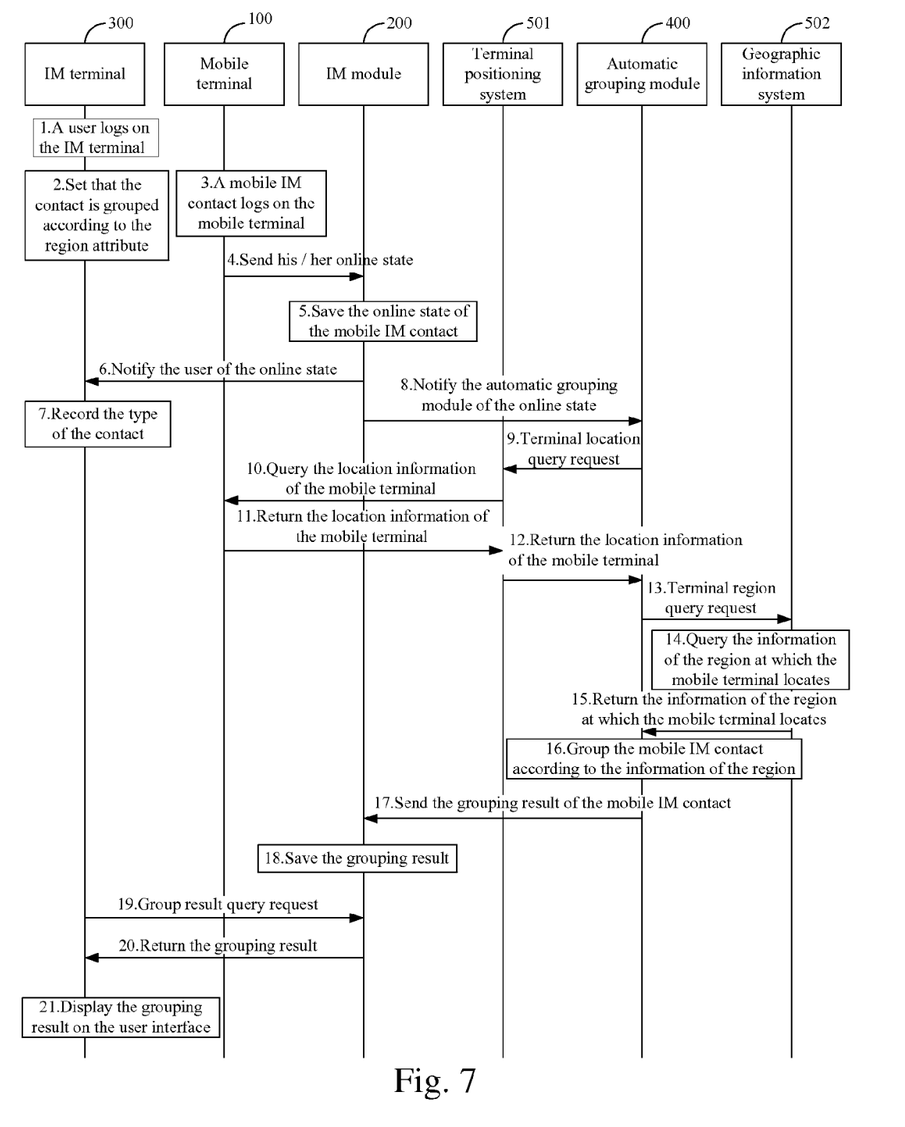
FIG. 7 is a schematic diagram illustrating a time sequence for grouping the mobile IM contact in accordance with an embodiment of the present invention.

FIG. 7 is a schematic diagram illustrating the time sequence for grouping a mobile IM contact in accordance with an embodiment of the present invention. The time sequence is on the basis of the system structure shown in FIG. 3, The specific process is as follows.

1. A user logs on an IM system with the IM terminal 300, and begins to perform IM functions.

2. The user sets in the IM terminal 300 that the grouping of the contact is performed according to the region attribute.

3. A mobile IM contact logs on the IM system with the mobile terminal 100. It should be noted that there is no specific time sequence between processes 2 and 3, which may be performed at the same time.

4. The mobile IM contact sends his/her online state to the IM module 200.

5. The IM module 200 stores the online state of the mobile IM contact.

6. The IM module 200 sends the online state of the mobile IM contact to the IM terminal 300 at which the user locates.

7. After receiving a notification, the IM terminal 300 records a type of the contact as the "mobile IM contact".

8. The IM module 200 sends the online state of the mobile IM contact to the automatic grouping module 400. It should be noted that there is no specific time sequence between process 8 and process 6 or 7, which may be performed at the same time.

9. The automatic grouping module 400 sends a terminal location query request to the terminal positioning system 501.

10. The terminal positioning system 501 further sends the terminal location query request to the mobile terminal 100.

11. The mobile terminal 100 returns its location information to the terminal positioning system 501.

12. The terminal positioning system 501 further returns the location information of the mobile terminal 100 to the automatic grouping module 400.

13. The automatic grouping module 400 sends a terminal region query request to the geographic information system 502 according to the location information of the mobile terminal 100.

14. The geographic information system 502 performs the query utilizing the GIS technology, to obtain information of the region at which the mobile terminal 100 locates.

15. The geographic information system 502 returns the information of the region at which the mobile terminal 100 locates to the automatic grouping module 400.

16. The automatic grouping module 400 groups the mobile IM contact according to the information of the region at which the mobile terminal 100 locates.

17. The automatic grouping module 400 sends the grouping result of the mobile IM contact to the IM module 200.

18. The IM module 200 receives and then saves the grouping result of the mobile IM contact.

19. The user who logs on the IM terminal 300 sends a query request to the IM module 200, for querying the grouping result of the contact.

20. The IM module 200 sends the grouping result of the mobile IM contact to the IM terminal 300.

21. The IM terminal 300 displays the grouping result of the mobile IM contact on the user interface. Thus, the user may be able to see the grouping result of the mobile IM contact according to the region attribute.

The foregoing are only preferred embodiments of the present invention, which are not used for limiting the present invention. Any modifications, equivalent substitutions and improvements within the spirit and principle of the present invention, should be covered by the protection scope of the present invention.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

What is claimed is:

1. A system for grouping a mobile Instant Messaging (IM) contact, comprising:
    a first IM terminal of a user, configured to send a query request to an IM module for querying a result of grouping a mobile IM contact of the user according to a region where a second IM terminal of the mobile IM contact locates, and display the result of grouping the mobile IM contact obtained from the IM module for the user;
    the IM module, configured to obtain the result of grouping the mobile IM contact from an automatic grouping module and send the result to the first IM terminal; and
    the automatic grouping module, configured to obtain information of the region where the second IM terminal of the mobile IM contact locates from a positioning module, generate a result of grouping the mobile IM contact according to the information of the region, and providing the IM module with the result.

2. The system according to claim 1, wherein:
    the first IM terminal is configured to display the mobile IM contact in a group corresponding to the region where the second IM terminal locates based on the result.

3. The system according to claim 1, wherein the positioning module comprises:
    a terminal positioning system, configured to determine location information of the second IM terminal utilizing a Location Based Service (LBS) technology according to a terminal location query request initiated by the automatic grouping module, and send the location information to the automatic grouping module; and
    a geographic information system, configured to determine the information of the region at which the mobile terminal locates utilizing a Geographic Information System (GIS) technology according to the location information and a terminal region query request sent from the automatic grouping module, and send the information of the region at which the mobile terminal locates to the automatic grouping module;
    wherein the automatic grouping module is further configured to receive the location information from the terminal positioning system, and send the location information and a terminal region query request to the geographic information system.

4. The system according to claim 1, wherein the automatic grouping module comprises:
    an information processing unit, configured to receive an online state of the mobile IM contact from the IM module, obtain the information of the region where the second IM terminal of the mobile IM contact locates from the positioning module, and send the result of grouping the mobile IM contact from a user grouping unit to the IM module; and
    the user grouping unit, configured to obtain the information of the region where the second IM terminal of the mobile IM contact locates from the information processing unit, group the mobile IM contact according to the information of the region, and send the grouping result of the mobile IM contact to the information processing unit.

5. An Instant Messaging (IM) terminal, comprising an automatic grouping module and a user interface, wherein
    the automatic grouping module is configured to receive an online state of a mobile IM contact of a user of the IM terminal, obtain information of a region where a second IM terminal of the mobile IM contact locates, and generate a result of grouping the mobile IM contact according to the information of the region;
    the user interface is configured to obtain the result of grouping the mobile IM contact generated by the automatic grouping module, and display the result of grouping the mobile IM contact for the user.

6. The IM terminal according to claim 5, wherein
    the user interface is configured to display the mobile IM contact in a group corresponding to the region where the second IM terminal locates based on the result.

7. The IM terminal according to claim 5, wherein the automatic grouping module comprises:

an information processing unit, configured to obtain location information of the second IM terminal from a terminal positioning system utilizing a Location Based Service (LBS) technology, send the location information to a geographic information system which utilizes a Geographic Information System (GIS) technology, obtain the information of the region at which the mobile terminal of the mobile IM contact locates from the geographic information system, and send the result of grouping the mobile IM contact to the user interface; and a user grouping unit, configured to obtain the information of the region where the second IM terminal of the mobile IM contact locates from the information processing unit, group the mobile IM contact according to the information of the region, and send the result of grouping the mobile IM contact to the information processing unit.

8. A method for grouping a mobile Instant Messaging (IM) contact, comprising:

sending, by a first IM terminal of a user, a query request to an IM module for querying a result of grouping a mobile IM contact of the user according to a region where a second IM terminal of the mobile IM contact locates;

obtaining, by an automatic grouping module, information of a region at which a second IM terminal of a mobile IM contact locates;

grouping, by the automatic grouping module, the mobile IM contact according to the information of the region;

obtaining, by the IM module, the result of grouping the mobile IM contact from an automatic grouping module, and sending the result to the first IM terminal; and displaying, by the first IM terminal, the result of grouping the mobile IM contact obtained from the IM module for the user.

9. The method according to claim 8, further comprising:

obtaining an online state of the mobile IM contact; and wherein obtaining the information of the region where the second IM terminal of the mobile IM contact locates comprises:

obtaining the information of the region where the second IM terminal of the mobile IM contact locates according to the online state of the mobile IM contact.

10. The method according to claim 8, wherein obtaining the information of the region where the second IM terminal of the mobile IM contact locates comprises:

obtaining location information of the second IM terminal determined utilizing a Location Based Service (LBS) technology; and obtaining the information of the region where the second IM terminal locates by utilizing a Geographic Information System (GIS) technology according to the location information of the second IM terminal.

11. The method according to claim 8, wherein displaying the result of grouping the mobile IM contact obtained from the IM module for the user comprises:

displaying the mobile IM contact in a group corresponding to the region on a user interface of the first IM terminal of the user according to the result of grouping the mobile IM contact.

* * * * *